US012784683B2

(12) United States Patent
Ryu

(10) Patent No.: US 12,784,683 B2
(45) Date of Patent: Nov. 3, 2026

(54) DISPLAY DEVICE INCLUDING DUMMY SUBPIXEL

(71) Applicant: LG Display Co., Ltd., Seoul (KR)

(72) Inventor: Young-Wan Ryu, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/217,313

(22) Filed: May 23, 2025

(65) Prior Publication Data

US 2026/0141849 A1 May 21, 2026

(30) Foreign Application Priority Data

Nov. 21, 2024 (KR) ........................ 10-2024-0166798

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0413* (2013.01); *G09G 2300/0842* (2013.01); *G09G 2320/0233* (2013.01); *G09G 2330/08* (2013.01)

(58) Field of Classification Search
None
See application file for complete search history.

(56) References Cited

U.S. PATENT DOCUMENTS

2007/0234152 A1* 10/2007 Kwon .................. G09G 3/3233 714/726
2020/0175911 A1* 6/2020 Ko ......................... G09G 3/325

FOREIGN PATENT DOCUMENTS

KR 20140106953 A 9/2014
KR 20150136670 A 12/2015

* cited by examiner

*Primary Examiner* — Nicholas J Lee
(74) *Attorney, Agent, or Firm* — Seed Intellectual Property Law Group LLP

(57) ABSTRACT

A display device including a dummy subpixel is provided. The display device includes: a timing controlling circuit generating an image data, a data control signal, and a gate control signal; a data driving circuit generating a data signal using the image data and the data control signal; a gate driving circuit generating a gate signal using the gate control signal; a display panel displaying an image using the data signal and the gate signal and including a display area and a non-display area at a periphery of the display area; a plurality of subpixels in the display area, each of the plurality of subpixels including a plurality of transistors, a storage capacitor and a light emitting diode; and a plurality of dummy subpixels in the non-display area, each of the plurality of dummy subpixels including a plurality of dummy transistors and a dummy capacitor and connecting a data line having an open portion and an adjacent data line.

18 Claims, 20 Drawing Sheets

110

TP3

DISPLAY DEVICE INCLUDING DUMMY SUBPIXEL

CROSS-REFERENCE TO RELATED APPLICATION

The present application claims the priority of Republic of Korea Patent Application No. 10-2024-0166798 filed on Nov. 21, 2024, which is hereby incorporated by reference in its entirety.

BACKGROUND

Technical Field

The present disclosure relates to a display device, and more particularly, to a display device including a dummy subpixel where a repair circuit connecting a cut data line to an adjacent data line when a data line is cut is disposed.

Description of the Related Art

Recently, with the advent of an information-oriented society, the interest in information displays for processing and displaying a massive amount of information and the demand for portable information media have increased. Further, as a request for using a portable information media increases, various light and thin flat panel display devices have been developed and highlighted.

Among the various flat panel display devices, an organic light emitting diode (OLED) display device is an emissive type device that does not include a backlight unit used in a non-emissive type device such as a liquid crystal display (LCD) device. As a result, the OLED display device has advantages in a viewing angle, a contrast ratio and a power consumption to be applied to various fields.

Specifically, the OLED display device has been used for a dashboard of a vehicle. Since a driving unit such as a chip on film (COF) is attached to a display panel in the OLED display device for a vehicle, a data line may be deteriorated to be cut (electrical open) due to a foreign matter or an external impact.

When the data line is cut, a voltage of the data line that is cut and floated increases due to a coupling during a sampling period for compensating a threshold voltage. As a result, a light emitting diode of a plurality of subpixels connected to the data line emits a light of a relatively high luminance to cause a line defect (LD) such as a bright line, and a display quality of an image is deteriorated.

BRIEF SUMMARY

The present disclosure is directed to a display device that, among others, substantially obviates one or more of the problems due to limitations and disadvantages of the related art.

The present disclosure provides a display device where a line defect such as a bright line is prevented and a display quality of an image is improved by disposing a repair circuit connecting a cut data line to an adjacent data line in a dummy subpixel of a non-display area.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes: a timing controlling circuit configured to generate an image data, a data control signal, and a gate control signal; a data driving circuit configured to generate a data signal using the image data and the data control signal; a gate driving circuit configured to generate a gate signal using the gate control signal; a display panel displaying an image using the data signal and the gate signal and including a display area and a non-display area at a periphery of the display area; a plurality of subpixels in the display area, each of the plurality of subpixels including a plurality of transistors, a storage capacitor and a light emitting diode; and a plurality of dummy subpixels in the non-display area, each of the plurality of dummy subpixels including a plurality of dummy transistors and a dummy capacitor and connecting a data line having an open portion and an adjacent data line.

In addition, on the other hand, a display device includes: a display panel including a display area and a non-display area at a periphery of the display area; a plurality of subpixels in the display area, each of the plurality of subpixels including a plurality of transistors, a storage capacitor and a light emitting diode; and a plurality of dummy subpixels in the non-display area, each of the plurality of dummy subpixels is connected between two data lines.

It is to be understood that both the foregoing general description and the following detailed description are explanatory and are intended to provide further explanation of the disclosure and claims.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Figure 1:
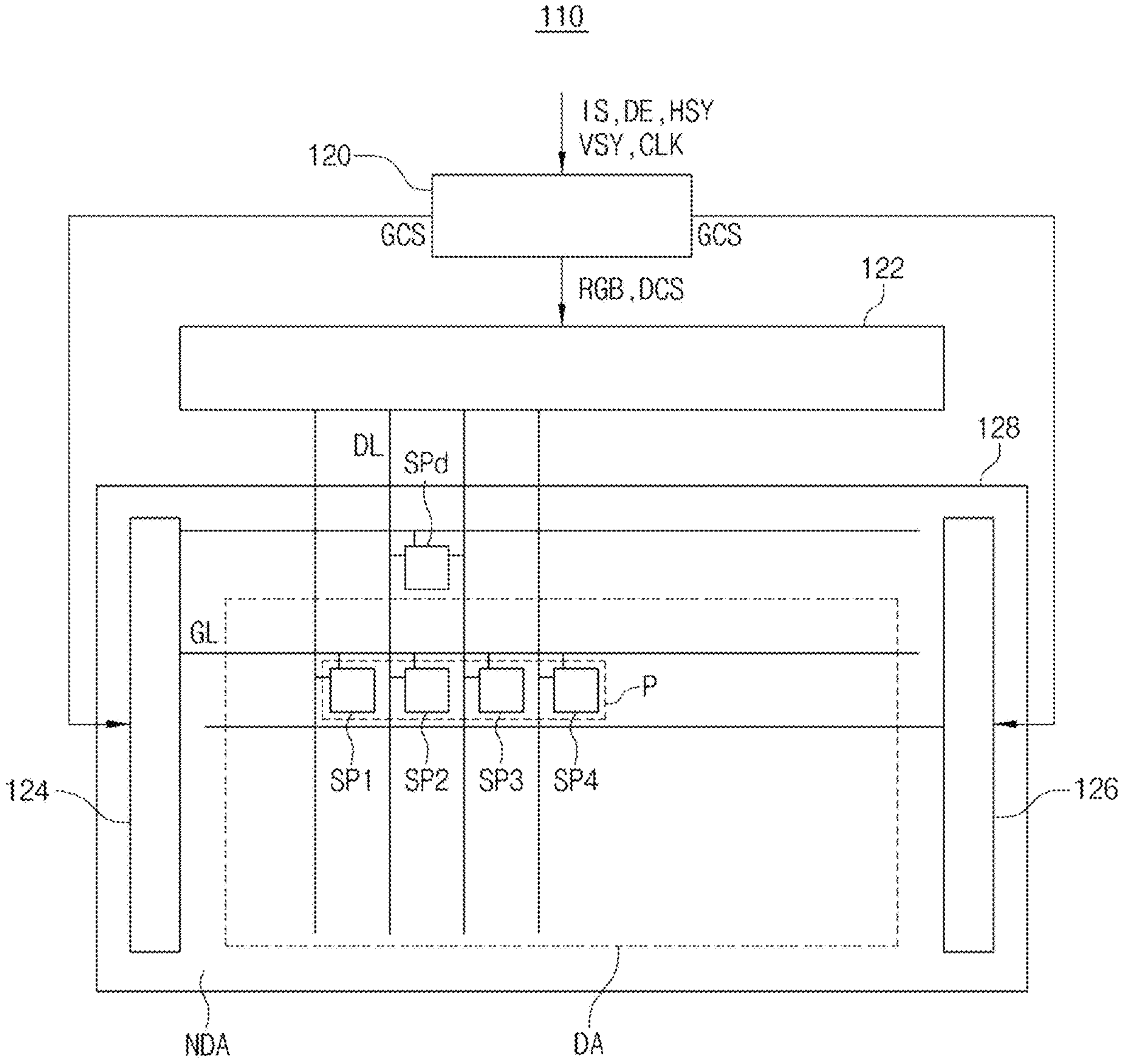
FIG. 1 is a view showing a display device according to an embodiment of the present disclosure.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure.

The shapes, sizes, ratios, angles, numbers, and the like, which are illustrated in the drawings to describe various example aspects of the present disclosure, are merely given by way of example. Therefore, the present disclosure is not limited to the illustrations in the drawings. Like reference numerals refer to like elements throughout the specification, unless otherwise specified.

In the following description, where the detailed description of the relevant known function or configuration may unnecessarily obscure a feature or aspect of the present disclosure, a detailed description of such known function or configuration may be omitted or a brief description may be provided.

Where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is to be construed as including an error or a tolerance range even where no explicit description of such an error or tolerance range is provided.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Although the terms "first," "second," A, B, (a), (b), and the like may be used herein to refer to various elements, these elements should not be interpreted to be limited by these terms as they are not used to define a particular order or precedence. These terms are only used to distinguish one element from another. For example, a first element could be termed a second element, and, similarly, a second element could be termed a first element, without departing from the scope of the present disclosure.

The term "at least one" should be understood to include all combinations of one or more of related elements. For example, the term of "at least one of first, second and third elements" may include all combinations of two or more of the first, second and third elements as well as the first, second or third element.

The term "display device" may include a display device in a narrow sense such as liquid crystal module (LCM), an organic light emitting diode (OLED) module and a quantum dot (QD) module including a display panel and a driving unit for driving the display panel. In addition, the term "display device" may include a complete product (or a final product) including the LCM, the OLED module and the QD module such as a notebook computer, a television, a computer monitor, an equipment display device including an automotive display apparatus or a shape other than a vehicle, and a set electronic apparatus or a set device (or a set apparatus) such as a mobile electronic apparatus of a smart phone or an electronic pad.

Accordingly, a display device of the present disclosure may include an applied product or a set device of a final user's device including the LCM, the OLED module and the QD module as well as a display device in a narrow sense such as the LCM, the OLED module and the QD module.

According to circumstances, the LCM, the OLED module and the QD module having a display panel and a driving unit may be expressed as "a display device", and an electronic apparatus of a complete product including the LCM, the OLED module and the QD module may be expressed as "a set device." For example, a display device in a narrow sense may include a display panel of a liquid crystal, an organic light emitting diode and a quantum dot and a source printed circuit board (PCB) of a control unit for driving the display panel, and a set device may further include a set PCB of a set control unit electrically connected to the source PCB for controlling the entire set device.

The display panel of the present disclosure may include all kinds of display panels such as a liquid crystal display panel, an organic light emitting diode display panel, a quantum dot display panel and an electroluminescent display panel. The display panel of the present disclosure is not limited to a specific display panel of a bezel bending having a flexible substrate for an organic light emitting diode display panel and a lower back plate supporter. A shape or a size of the display panel for the display device of the present disclosure is not limited thereto.

For example, when the display panel is an organic light emitting diode display panel, the display panel may include a plurality of gate lines, a plurality of data lines and a subpixel in a crossing region of the plurality of gate lines and the plurality of data lines. The display panel may include an array having a thin film transistor of an element for selectively applying a voltage to each subpixel, an emitting element layer on the array and an encapsulating substrate or an encapsulation part covering the emitting element layer. The encapsulation part may protect the thin film transistor and the emitting element layer from an external impact and may prevent or at least reduce penetration of a moisture or oxygen into the emitting element layer. In addition, the emitting element layer on the array may include an inorganic light emitting layer, for example, a nano-sized material layer or a quantum dot.

The thin film transistor of the present disclosure may include one of an oxide thin film transistor, an amorphous silicon thin film transistor, and a low temperature polycrystalline silicon thin film transistor.

Features of various embodiments of the present disclosure may be partially or entirely coupled to or combined with each other. They may be linked and operated technically in various ways as those skilled in the art may sufficiently understand. The aspects may be carried out independently of or in association with each other in various combinations.

Hereinafter, a display device including a dummy subpixel according to various example embodiments of the present disclosure will be described in detail with reference to the accompanying drawings.

FIG. 1 is a view showing a display device according to an embodiment of the present disclosure. The display device may be an organic light emitting diode (OLED) display device. For example, the display device may be a quantum dot display device, a micro light emitting diode (LED) display device, or a mini light emitting diode (LED) display device.

In FIG. 1, a display device 110 according to an embodiment of the present disclosure includes a timing controlling unit 120 (e.g., a circuit), a data driving unit 122 (e.g., a circuit), first and second gate driving units 124 and 126 (e.g., circuits) and a display panel 128.

The timing controlling unit 120 generates an image data RGB, a data control signal DCS and a gate control signal GCS using an image signal IS and a plurality of timing signals including a data enable signal DE, a horizontal synchronization signal HSY, a vertical synchronization signal VSY and a clock signal CLK transmitted from an external system such as a graphic card or a television system.

The timing controlling unit 120 transmits the image data RGB and the data control signal DCS to the data driving unit 122, and transmits the gate control signal GCS to the first and second gate driving units 124 and 126.

The data driving unit 122 generates a data signal (a data voltage) Vda (of FIG. 2) using the image data RGB and the data control signal DCS transmitted from the timing controlling unit 120 and transmits the data signal Vda to a data line DL of the display panel 128.

The first and second gate driving units 124 and 126 generate a gate signal (a gate voltage) Sc1, Sc2 and Em (of FIG. 2) using the gate control signal GCS transmitted from the timing controlling unit 120 and applies the gate signal Sc1, Sc2 and Em to a gate line GL of the display panel 128.

The first and second gate driving units 124 and 126 may have a gate in panel (GIP) type to be formed in a non-display area NDA of a substrate of the display panel 128 having the gate line GL, the data line DL and a pixel P.

Although the first and second gate driving units 124 and 126 are disposed in both side portions of the display panel 128 in the embodiment of FIG. 1, one gate driving unit may be disposed in one side portion of the display panel 128 in another embodiment.

The display panel 128 includes a display area DA at a central portion thereof and a non-display area NDA surrounding the display area DA or at a periphery of the display area DA. The display panel 128 displays an image using the gate signal Sc1, Sc2 and Em and the data signal Vda.

For displaying an image, the display panel 128 includes a plurality of pixels P, a plurality of gate lines GL and a plurality of data lines DL in the display area DA.

Each of the plurality of pixels P includes first to fourth subpixels SP1 to SP4, and the gate line GL and the data line DL cross each other to define the first to fourth subpixels SP1 to SP4. Each of the first to fourth subpixels SP1 to SP4 is connected to the gate line GL and the data line DL.

For example, the first to fourth subpixels SP1 to SP4 may correspond to red, green, blue and white colors, respectively.

Although one pixel P exemplarily includes the first to fourth subpixels SP1 to SP4 in the embodiment of FIG. 1, one pixel P may include first, second and third subpixels SP1, SP2 and SP3 corresponding to red, green and blue colors, respectively, in another embodiment.

Figure 2:
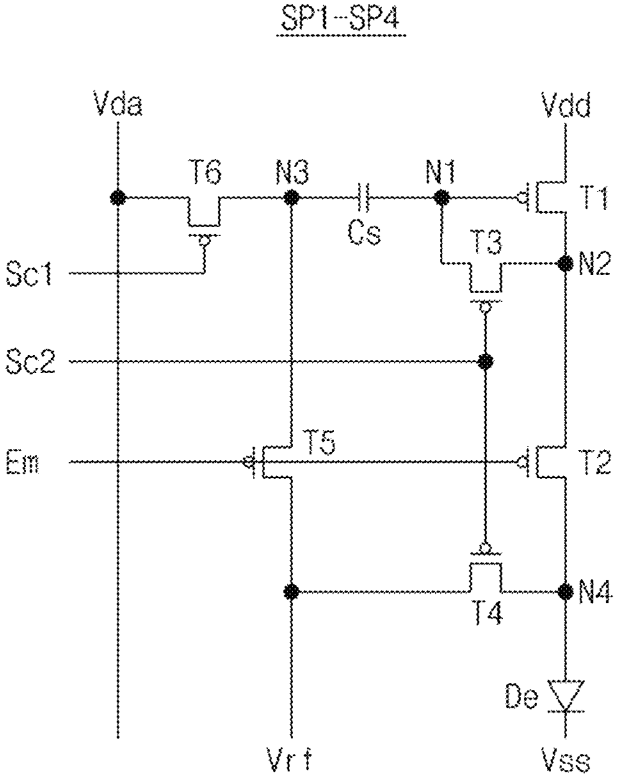
FIG. 2 is a circuit diagram showing a subpixel of a display device according to an embodiment of the present disclosure.

When the display device 110 is an OLED display device, each of the first to fourth subpixels SP1 to SP4 may include a plurality of transistors T1 to T6 (of FIG. 2) such as a switching transistor, a driving transistor and a sensing transistor, a storage capacitor Cs (of FIG. 2) and a light emitting diode De (of FIG. 2).

The display panel 128 includes a plurality of dummy subpixels SPd at an upper portion of the non-display area NDA for repairing a cut (open) data line by connecting the cut data line to an adjacent data line.

Figure 3:
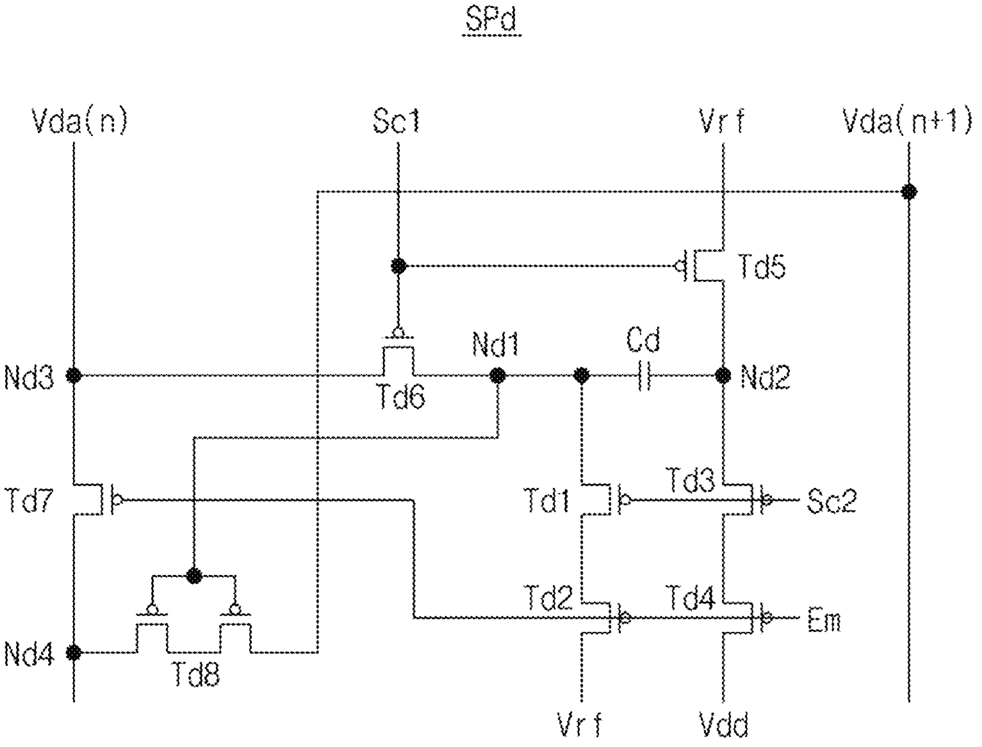
FIG. 3 is a circuit diagram showing a dummy subpixel of a display device according to an embodiment of the present disclosure.

Each of the plurality of dummy subpixels SPd may include a plurality of dummy transistors Td1 to Td8 (of FIG. 3) and a dummy capacitor Cd (of FIG. 3). Herein, each of the plurality of dummy subpixels SPd may not include a light emitting diode De.

A structure of the first to fourth subpixels SP1 to SP4 and the dummy subpixel SPd of the display device 110 will be illustrated with reference to drawings.

FIG. 2 is a circuit diagram showing a subpixel of a display device according to an embodiment of the present disclosure, and FIG. 3 is a circuit diagram showing a dummy subpixel of a display device according to an embodiment of the present disclosure.

In FIG. 2, each of the first to fourth subpixels SP1 to SP4 of the display panel 128 of the display device 110 according to an embodiment of the present disclosure includes first to sixth transistors T1 to T6, a storage capacitor Cs and a light emitting diode De.

Although the first to sixth transistors T1 to T6 may have a positive type in the embodiment of FIG. 2, at least one of the first to sixth transistors T1 to T6 may have a negative type in another embodiment.

The first transistor T1 as a driving transistor is switched according to a voltage of a first node N1. A gate electrode of the first transistor T1 is connected to the first node N1, a source electrode of the first transistor T1 is connected to a high level signal (high level voltage) Vdd, and a drain electrode of the first transistor T1 is connected to a second node N2.

The second transistor T2 as an emitting transistor is switched according to an emission signal Em. A gate electrode of the second transistor T2 is connected to the emission signal Em, a source electrode of the second transistor T2 is connected to the second node N2, and a drain electrode of the second transistor T2 is connected to a fourth node N4.

The third transistor T3 as a sensing transistor is switched according to a second scan signal Sc2. A gate electrode of the third transistor T3 is connected to the second scan signal Sc2, a source electrode of the third transistor T3 is connected to the second node N2, and a drain electrode of the third transistor T3 is connected to the first node N1.

The fourth transistor T4 is switched according to the second scan signal Sc2. A gate electrode of the fourth transistor T4 is connected to the second scan signal Sc2, a source electrode of the fourth transistor T4 is connected to a fourth node N4, and a drain electrode of the fourth transistor T4 is connected to a reference signal (reference voltage) Vrf.

The fifth transistor T5 is switched according to the emission signal Em. A gate electrode of the fifth transistor T5 is connected to the emission signal Em, a source electrode of the fifth transistor T5 is connected to the third node N3, and a drain electrode of the fifth transistor T5 is connected to the reference signal Vrf.

The sixth transistor T6 as a switching transistor is switched according to a first scan signal Sc1. A gate electrode of the sixth transistor T6 is connected to the first scan signal Sc1, a source electrode of the sixth transistor T6 is connected to the third node N3, and a drain electrode of the sixth transistor T6 is connected to the data signal Vda.

The storage capacitor Cs stores the data signal Vda and the threshold voltage Vth of the first transistor T1. A first capacitor electrode of the storage capacitor Cs is connected to the first node N1, and a second capacitor electrode of the storage capacitor Cs is connected to the third node N3.

The light emitting diode De is connected between the fourth node N4 and a low level signal (low level voltage) Vss to emit a light of a luminance proportional to a current of the first transistor T1. An anode of the light emitting diode De is connected to the fourth node N4, and a cathode of the light emitting diode De is connected to the low level signal Vss.

The gate electrode of the first transistor T1, the first capacitor electrode of the storage capacitor Cs and the drain electrode of the third transistor T3 constitute the first node N1, and the drain electrode of the first transistor T1, the source electrode of the second transistor T2 and the source electrode of the third transistor T3 constitute the second node N2. The second capacitor electrode of the storage capacitor Cs, the source electrode of the fifth transistor T5 and the source electrode of the sixth transistor T6 constitute the third node N3, and the drain electrode of the second transistor T2, the source electrode of the fourth transistor T4, and the anode of the light emitting diode De constitute the fourth node N4.

Although one subpixel has a 6T1C structure having six transistors and one storage capacitor in the embodiment of FIG. 2, one subpixel may have one of a 3T1C structure having three transistors and one storage capacitor, a 7T1C structure having seven transistors and one storage capacitor and a 8T1C structure having eight transistors and one storage capacitor in another embodiment.

In FIG. 3, the dummy subpixel SPd of the display panel 128 of the display device 110 according to an embodiment of the present disclosure includes first to eighth dummy transistors Td1 to Td8 and a dummy capacitor Cd.

Although the first to eighth dummy transistors Td1 to Td8 may have a positive type in the embodiment of FIG. 3, at least one of the first to eighth dummy transistors Td1 to Td8 may have a negative type in another embodiment.

The first dummy transistor Td1 is switched according to the second scan signal Sc2. A gate electrode of the first dummy transistor Td1 is connected to the second scan signal Sc2, a source electrode of the first dummy transistor Td1 is connected to a first dummy node Nd1, and a drain electrode of the first dummy transistor Td1 is connected to a source electrode of the second dummy transistor Td2.

The second dummy transistor Td2 is switched according to the emission signal Em. A gate electrode of the second dummy transistor Td2 is connected to the emission signal Em, a source electrode of the second dummy transistor Td2 is connected to the drain electrode of the first dummy transistor Td1, and a drain electrode of the second dummy transistor Td2 is connected to the reference signal Vrf.

The third dummy transistor Td3 is switched according to the second scan signal Sc2. A gate electrode of the third dummy transistor Td3 is connected to the second scan signal Sc2, a source electrode of the third dummy transistor Td3 is connected to a second dummy node Nd2, and a drain electrode of the third dummy transistor Td3 is connected to a source electrode of the fourth dummy transistor Td4.

The fourth dummy transistor Td4 is switched according to the emission signal Em. A gate electrode of the fourth dummy transistor Td4 is connected to the emission signal Em, a source electrode of the fourth dummy transistor Td4 is connected to a drain electrode of the third dummy transistor Td3, and a drain electrode of the fourth dummy transistor Td4 is connected to the high level signal Vdd.

The fifth dummy transistor Td5 is switched according to the first scan signal Sc1. A gate electrode of the fifth dummy transistor Td5 is connected to the first scan signal Sc1, a source electrode of the fifth dummy transistor Td5 is connected to the reference signal Vrf, and a drain electrode of the fifth dummy transistor Td5 is connected to the second dummy node Nd2.

The sixth dummy transistor Td6 is switched according to the first scan signal Sc1. A gate electrode of the sixth dummy transistor Td6 is connected to the first scan signal Sc1, a source electrode of the sixth dummy transistor Td6 is connected to the first dummy node Nd1, and a drain electrode of the sixth dummy transistor Td6 is connected to the third dummy node Nd3.

The seventh dummy transistor Td7 is switched according to the emission signal Em. A gate electrode of the seventh dummy transistor Td7 is connected to the emission signal Em, a source electrode of the seventh dummy transistor Td7 is connected to the third dummy node Nd3, and a drain electrode of the seventh dummy transistor Td7 is connected to the fourth dummy node Nd4.

The eighth dummy transistor Td8 is switched according to a voltage of the first dummy node Nd1. A gate electrode of the eighth dummy transistor Td8 is connected to the first dummy node Nd1, a source electrode of the eighth dummy transistor Td8 is connected to the fourth dummy node Nd4, and a drain electrode of the eighth dummy transistor Td8 is connected to an adjacent (n+1)th data line.

Although the eighth dummy transistor Td8 has a dual gate type including two gate electrodes and two channels in the embodiment of FIG. 3, the eighth dummy transistor Td8 may have a single gate type including one gate electrode and one channel in another embodiment.

The dummy capacitor Cd is connected between the first and second dummy nodes Nd1 and Nd2. A first capacitor electrode of the dummy capacitor Cd is connected to the first dummy node Nd1, and a second capacitor electrode of the dummy capacitor Cd is connected to the second dummy node Nd2.

The source electrode of the first dummy transistor Td1, the source electrode of the sixth dummy transistor Td6 and the first capacitor electrode of the dummy capacitor constitute the first dummy node Nd1, and the source electrode of the third dummy transistor Td3, the drain electrode of the fifth dummy transistor Td5 and the second capacitor electrode of the dummy capacitor Cd constitute the second dummy node Nd2. The drain electrode of the sixth dummy transistor Td6, the source electrode of the seventh dummy transistor Td7 and a present nth data line constitute the third dummy node Nd3, and the drain electrode of the seventh dummy transistor Td7 and the source electrode of the eighth dummy transistor Td8 constitute the fourth dummy node Nd4. Herein, n may be a positive integer.

An operation of the subpixels SP1 to SP4 and the dummy subpixel SPd of the display device 110 will be illustrated with reference to drawings.

Figure 4:
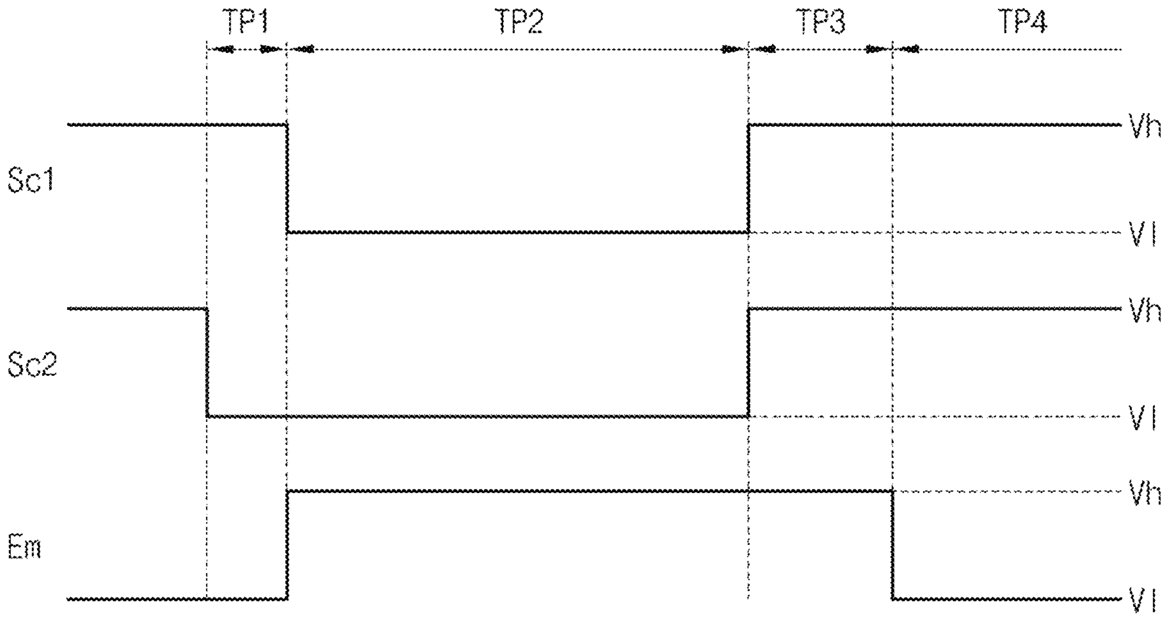
FIG. 4 is a view showing a plurality of signals of a subpixel and a dummy subpixel of a display device according to an embodiment of the present disclosure.

FIG. 4 is a view showing a plurality of signals of a subpixel and a dummy subpixel of a display device according to an embodiment of the present disclosure, FIGS. 5A to 5D are views showing operation states of a subpixel of a display device according to an embodiment of the present disclosure, FIGS. 6A to 6D are views showing operation states of a dummy subpixel for a normal data line of a display device according to an embodiment of the present disclosure, and FIGS. 7A to 7D are views showing operation states of a dummy subpixel for a cut data line of a display device according to an embodiment of the present disclosure.

Figure 5A:
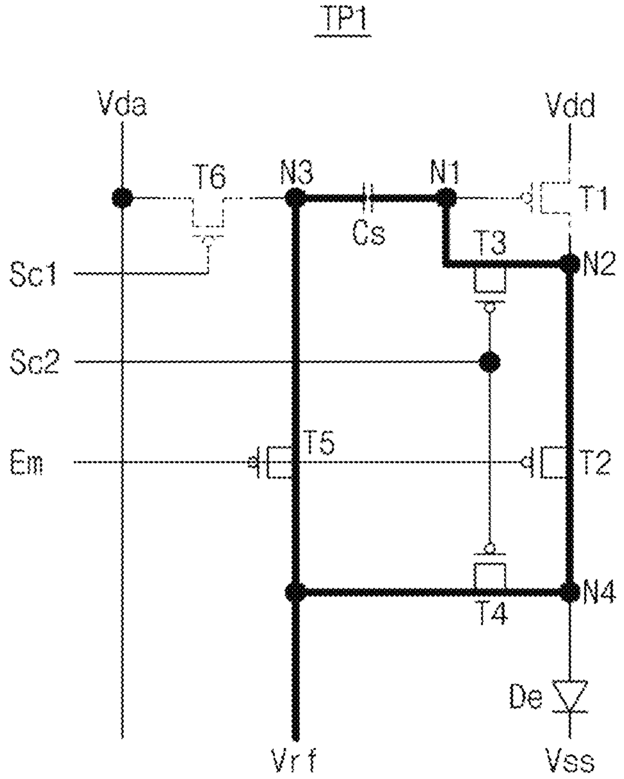
FIGS. 5A to 5D are views showing operation states of a subpixel of a display device according to an embodiment of the present disclosure.

In FIGS. 4 and 5A, during a first time period TP1 as an initial period, the second, third, fourth and fifth transistors T2, T3, T4 and T5 are turned on according to the second scan signal Sc2 and the emission signal Em of a logic low voltage Vl, and the sixth transistor T6 is turned off according to the first scan signal Sc1 of a logic high voltage Vh. Accordingly, the reference signal Vrf is applied to the first, second, third and fourth nodes N1, N2, N3 and N4, and the first transistor T1 is turned off. As a result, the first and second capacitor electrodes of the storage capacitor Cs, the gate electrode of the first transistor T1 and the anode of the light emitting diode De are initialized by the reference signal Vrf.

Figure 5B:
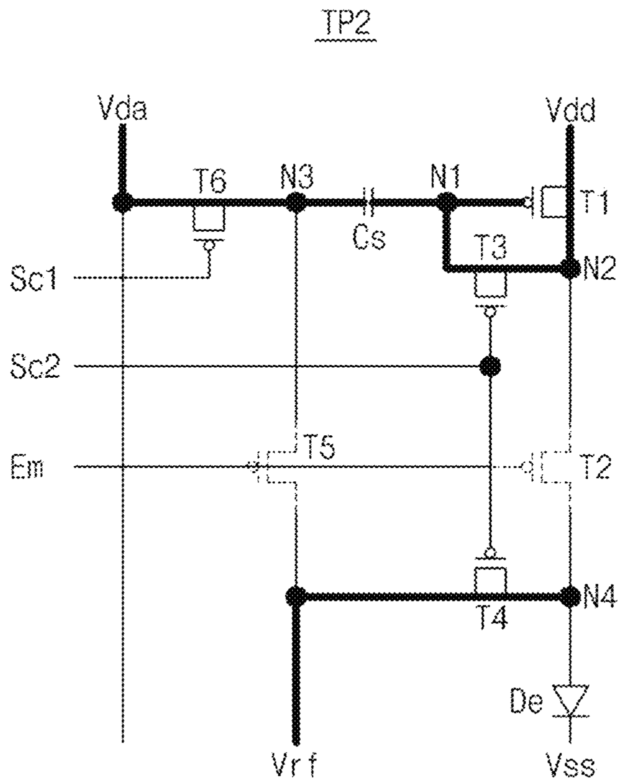

In FIGS. 4 and 5B, during a second time period TP2 as a sampling period, the third, fourth and sixth transistors T3, T4 and T6 are turned on according to the first scan signal Sc1 and the second scan signal Sc2 of a logic low voltage Vl, and the second and fifth transistors T2 and T5 are turned off according to the emission signal Em of a logic high voltage Vh. Accordingly, the data signal Vda and the reference signal Vrf are applied to the third and fourth nodes N3 and N4, respectively, and the first transistor T1 is turned on. As a result, the second capacitor electrodes of the storage capacitor Cs has the data signal Vda, and the first capacitor electrode of the storage capacitor Cs has a sum (Vdd+Vth) of the high level signal Vdd and the threshold voltage Vth. Further, the threshold voltage Vth is stored in the storage capacitor Cs, and the anode of the light emitting diode De is kept as the reference signal Vrf.

Figure 5C:
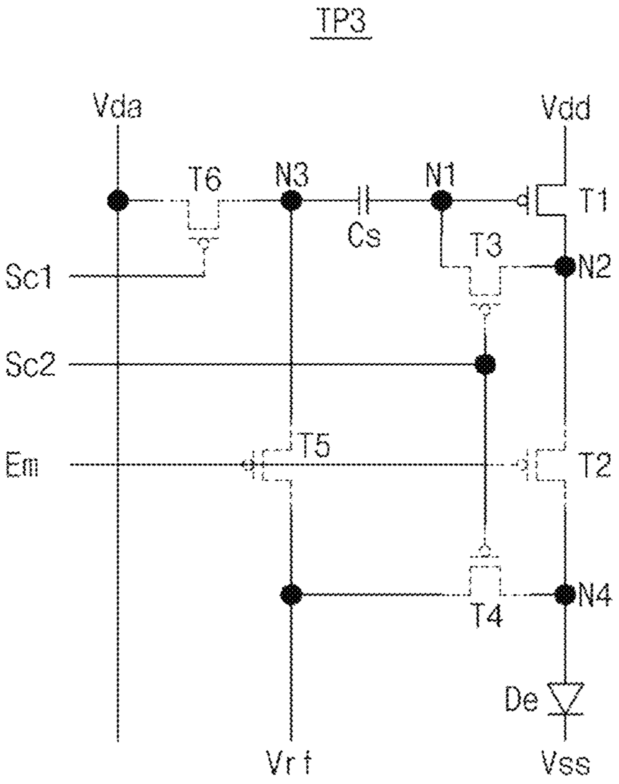

In FIGS. 4 and 5C, during a third time period TP3 as a holding period, the second, third, fourth, fifth and sixth transistors T2, T3, T4, T5 and T6 are turned off according to the first scan signal Sc1, the second scan signal Sc2, and the emission signal Em of a logic high voltage Vh. Accordingly, the second capacitor electrode of the storage capacitor Cs is kept as the data signal Vda, and the first capacitor electrode of the storage capacitor Cs is kept as the sum (Vdd+Vth) of the high level signal Vdd and the threshold voltage Vth. As a result, the threshold voltage Vth is kept to be stored in the storage capacitor Cs, and the anode of the light emitting diode De is kept as the reference signal Vrf.

Figure 5D:
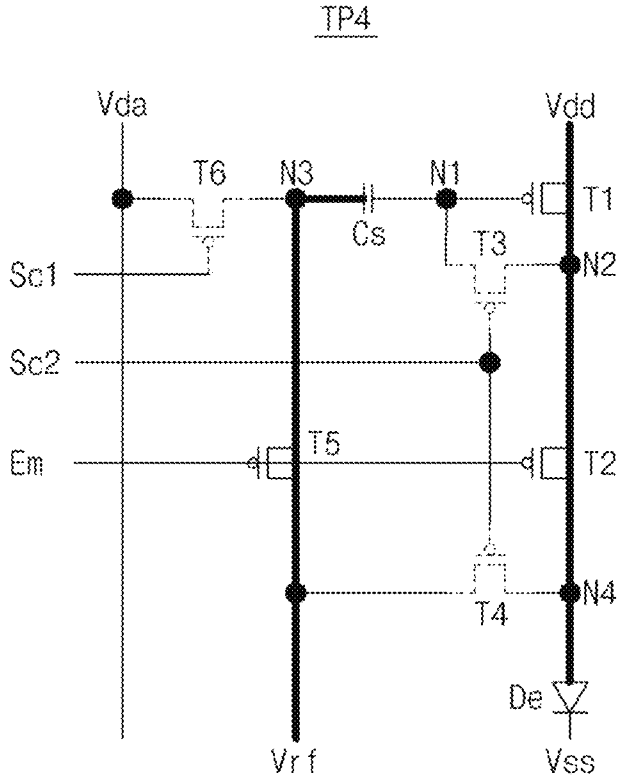

In FIGS. 4 and 5D, during a fourth time period TP4 as an emitting period, the second and fifth transistors T2 and T5 are turned on according to the emission signal Em of a logic low voltage Vl, and the third, fourth and sixth transistors T3, T4 and T6 are turned off according to the first scan signal Sc1 and the second scan signal Sc2 of a logic high voltage Vh. Accordingly, the reference signal Vrf is applied to the third node N3, and a voltage of the first node N1 becomes a sum (Vdd+Vth+Vrf−Vda) of the sum (Vdd+Vth) of the high level signal Vdd and the threshold voltage Vth and a value (Vrf−Vda) obtained by subtracting the data signal Vda from the reference signal Vrf. As a result, a current proportional to a square of a value ((Vth+Vrf−Vda)−Vth=Vrf−Vda) obtained by subtracting the threshold voltage Vth from a gate-source voltage (Vgs=(Vdd+Vth+Vrf−Vda)−Vdd=Vth+Vrf−Vda) flows through the first transistor T1, and the light emitting diode De emits a light having a luminance corresponding to the current flowing through the first transistor T1.

In each subpixel SP1 to SP4 of the display device 110 according to an embodiment of the present disclosure, the threshold voltage Vth of the first transistor T1 is stored in the storage capacitor Cs during the second time period TP2, and the light emitting diode De emits the light having the luminance corresponding to the data signal Vda during the fourth time period TP4 to display an image.

Figure 6A:
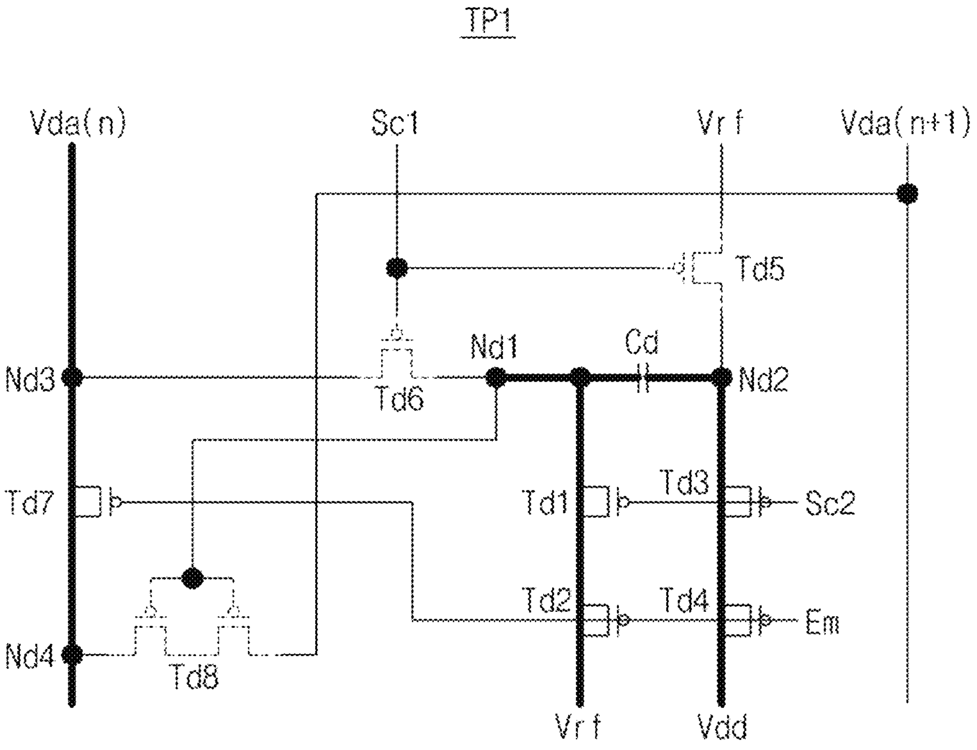
FIGS. 6A to 6D are views showing operation states of a dummy subpixel for a normal data line of a display device according to an embodiment of the present disclosure.

In FIGS. 4 and 6A, during the first time period TP1 where the data line does not have an open portion (is not cut), the first, second, third, fourth and seventh dummy transistors Td1, Td2, Td3, Td4 and Td7 are turned on according to the second scan signal Sc2 and the emission signal Em of a logic low voltage Vl, and the fifth and sixth dummy transistors Td5 and Td6 are turned off according to the first scan signal Sc1 of a logic high voltage Vh. Accordingly, the reference signal Vrf is applied to the first dummy node Nd1, and the high level signal Vdd is applied to the second dummy node Nd2. As a result, the first and second capacitor electrodes of the dummy capacitor Cd are initialized by the reference signal Vrf and the high level signal Vdd, respectively.

The eighth dummy transistor Td8 may have a turn-off state or a weak turn-on state. For example, the source electrode and the drain electrode of the eighth dummy transistor Td8 may have a voltage within a range of about 0V to about 4V.

Figure 6B:
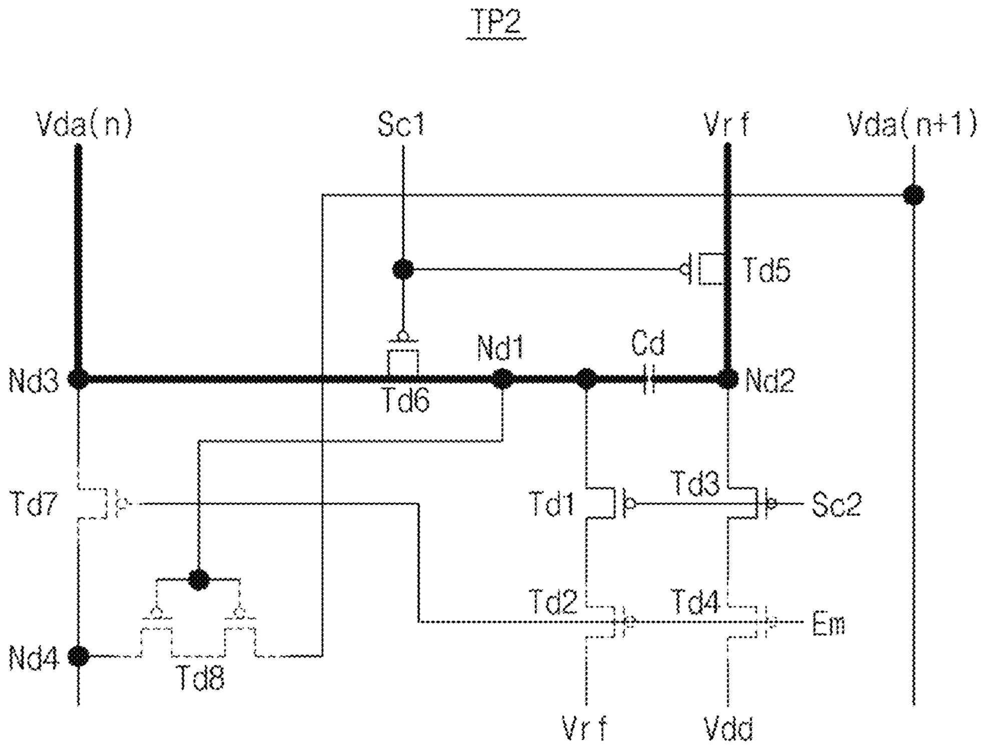

In FIGS. 4 and 6B, during the second time period TP2 where the data line does not have an open portion (is not cut), the first, third, fifth and sixth dummy transistors Td1, Td3, Td5 and Td6 are turned on according to the first scan signal Sc1 and the second scan signal Sc2 of a logic low voltage Vl, and the second, fourth and seventh dummy transistors Td2, Td4 and Td7 are turned off according to the emission signal Em of a logic high voltage Vh. Accordingly, the nth data signal Vda(n) is applied to the first dummy node Nd1, and the reference signal Vrf is applied to the second dummy node Nd2. Further, the eighth dummy transistor Td8 is turned off.

For example, the nth data signal Vda(n) may be a voltage higher than about 2V.

Figure 6C:
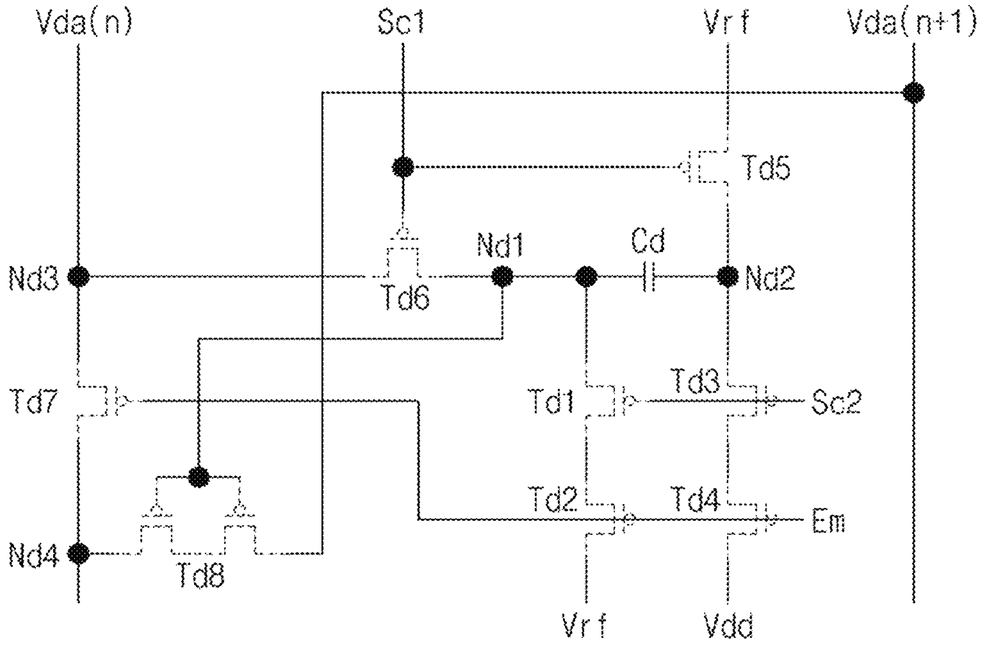

In FIGS. 4 and 6C, during the third time period TP3 where the data line does not have an open portion (is not cut), the first, second, third, fourth, fifth, sixth and seventh dummy transistors Td1, Td2, Td3, Td4, Td5, Td6 and Td7 are turned off according to the first scan signal Sc1, the second scan signal Sc2 and the emission signal Em of a logic high voltage Vh. Accordingly, the first dummy node Nd1 is kept as the nth data signal Vda(n), and the second dummy node Nd2 is kept as the reference signal Vrf. As a result, the eighth dummy transistor Td8 is kept as a turn-off state.

Figure 6D:
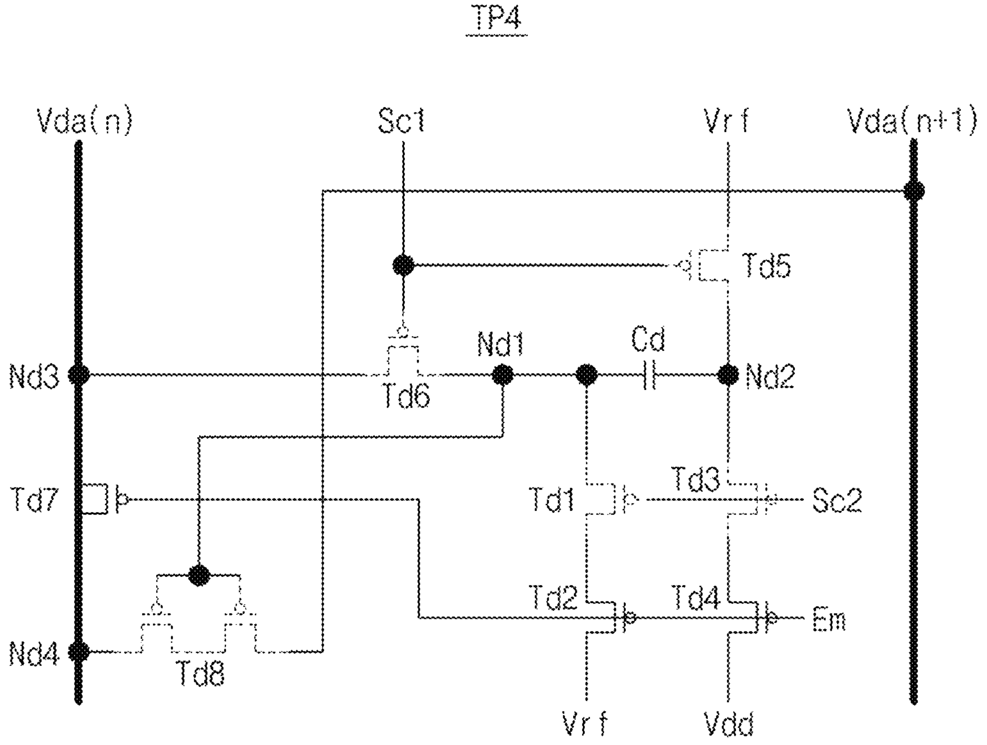

In FIGS. 4 and 6D, during the fourth time period TP4 where the data line does not have an open portion (is not cut), the second, fourth and seventh dummy transistors Td2, Td4 and Td7 are turned on according to the emission signal Em of a logic low voltage Vl, and the first, third, fifth and sixth dummy transistors Td1, Td3, Td5 and Td6 are turned off according to the first scan signal Sc1 and the second scan signal of a logic high voltage Vh. Accordingly, the nth data signal Vda(n) is applied to the nth data line through the third and fourth dummy nodes Nd3 and Nd4. As a result, the eighth dummy transistor Td8 is turned off, and the nth data line is not connected to and is separated from the (n+1)th data line.

In each dummy subpixel SPd of the display device 110 according to an embodiment of the present disclosure where the data line has an open portion (is not cut), the data signal Vda is stored in the dummy capacitor Cd during the second time period TP2, and the eighth dummy transistor Td8 is turned off during the fourth time period TP4 (for one frame) such that the nth and (n+1)th data lines are not connected to and are separated from each other. As a result, the nth and (n+1)th data lines may transmit the nth and (n+1)th data signals Vda(n) and Vda(n+1), respectively.

Figure 7A:
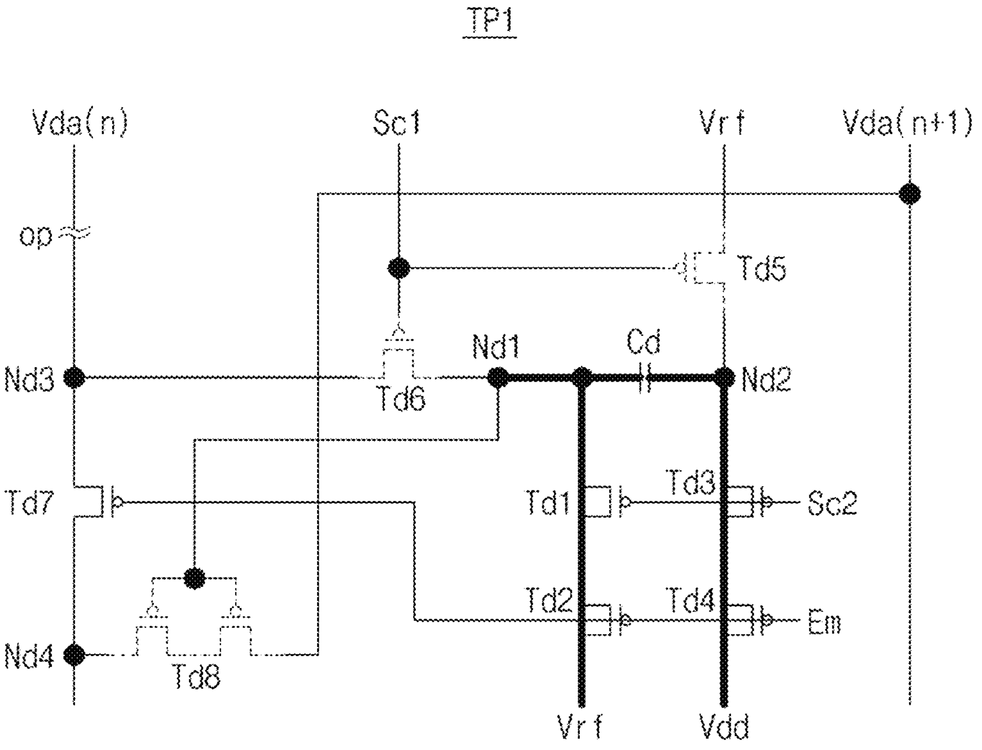
FIGS. 7A to 7D are views showing operation states of a dummy subpixel for a cut data line of a display device according to an embodiment of the present disclosure.

In FIGS. 4 and 7A, during the first time period TP1 where the data line has an open portion op (is cut), the first, second, third, fourth and seventh dummy transistors Td1, Td2, Td3, Td4 and Td7 are turned on according to the second scan signal Sc2 and the emission signal Em of a logic low voltage Vl, and the fifth and sixth dummy transistors Td5 and Td6 are turned off according to the first scan signal Sc1 of a logic high voltage Vh. Accordingly, the reference signal Vrf is applied to the first dummy node Nd1, and the high level signal Vdd is applied to the second dummy node Nd2. As a result, the first and second capacitor electrodes of the dummy capacitor Cd are initialized by the reference signal Vrf and the high level signal Vdd, respectively.

The eighth dummy transistor Td8 may have a turn-off state or a weak turn-on state. For example, the source electrode and the drain electrode of the eighth dummy transistor Td8 may have a voltage within a range of about 0V to about 4V.

Figure 7B:
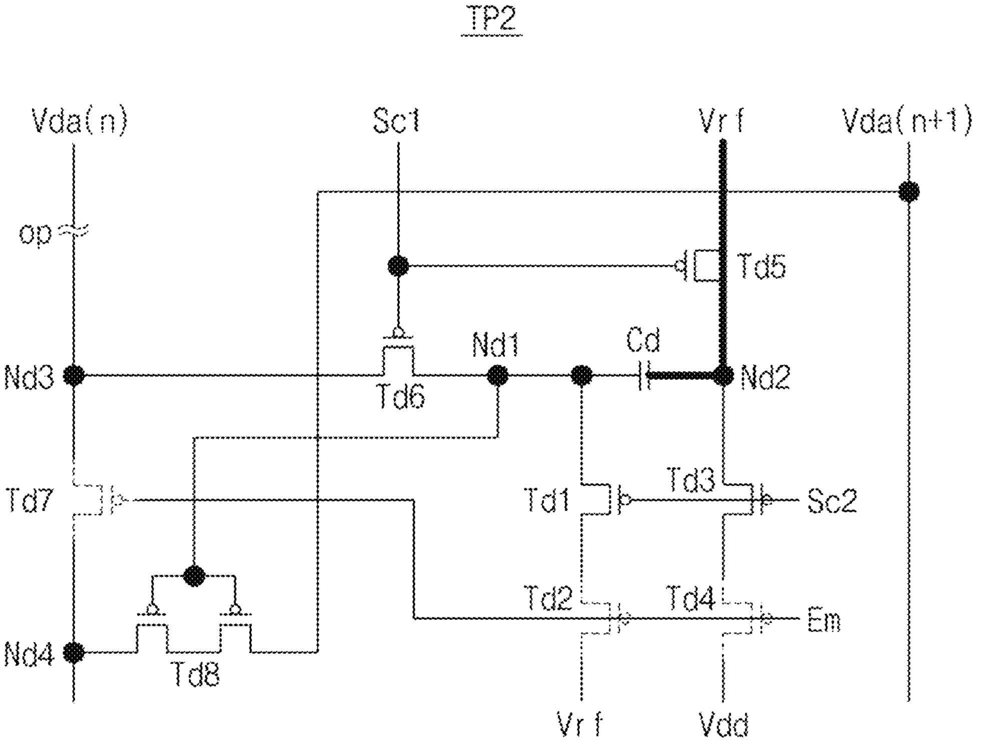

In FIGS. 4 and 7B, during the second time period TP2 where the data line has an open portion op (is cut), the first, third, fifth and sixth dummy transistors Td1, Td3, Td5 and Td6 are turned on according to the first scan signal Sc1 and the second scan signal Sc2 of a logic low voltage Vl, and the second, fourth and seventh dummy transistors Td2, Td4 and Td7 are turned off according to the emission signal Em of a logic high voltage Vh. Accordingly, the first dummy node Nd1 becomes a sum (Vrf+Vrf−Vdd=2Vrf−Vdd) of the reference signal Vrf and a value obtained by subtracting the high level signal Vdd from the reference signal Vrf due to a coupling, and the eighth dummy transistor Td8 is turned on.

Figure 7C:
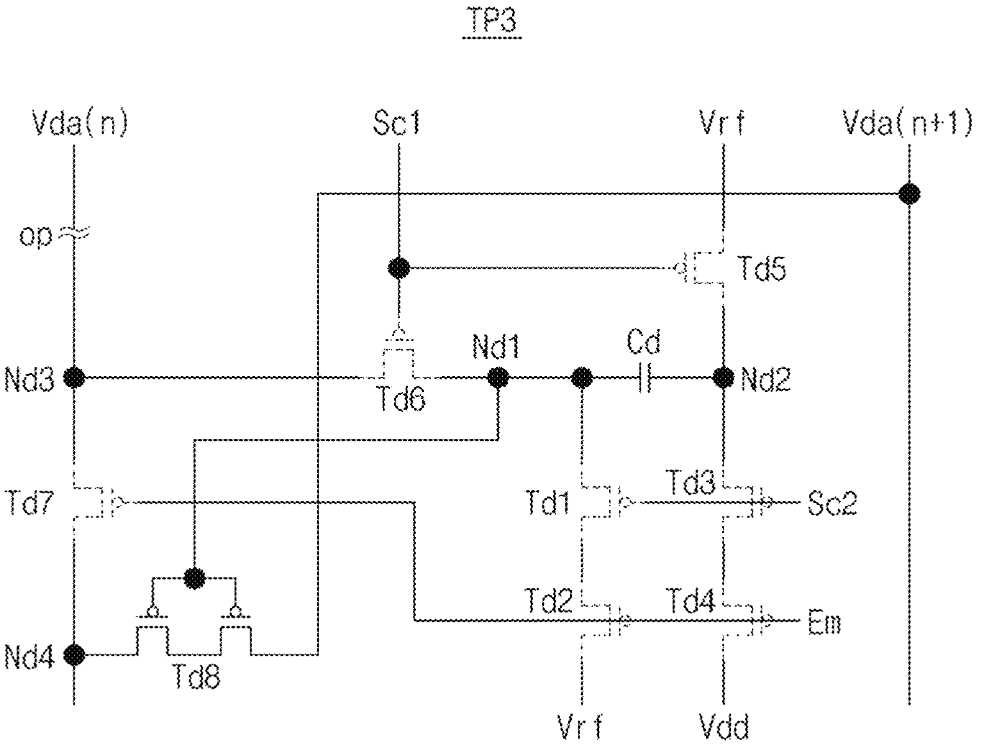

In FIGS. 4 and 7C, during the third time period TP3 where the data line has an open portion op (is cut), the first, second, third, fourth, fifth, sixth and seventh dummy transistors Td1, Td2, Td3, Td4, Td5, Td6 and Td7 are turned off according to the first scan signal Sc1, the second scan signal Sc2 and the emission signal Em of a logic high voltage Vh. Accordingly, the first dummy node Nd1 is kept as the sum (Vrf+Vrf−Vdd=2Vrf−Vdd) of the reference signal Vrf and a value obtained by subtracting the high level signal Vdd from the reference signal Vrf, and the second dummy node Nd2 is kept as the reference signal Vrf. As a result, the eighth dummy transistor Td8 is kept as a turn-on state.

Figure 7D:
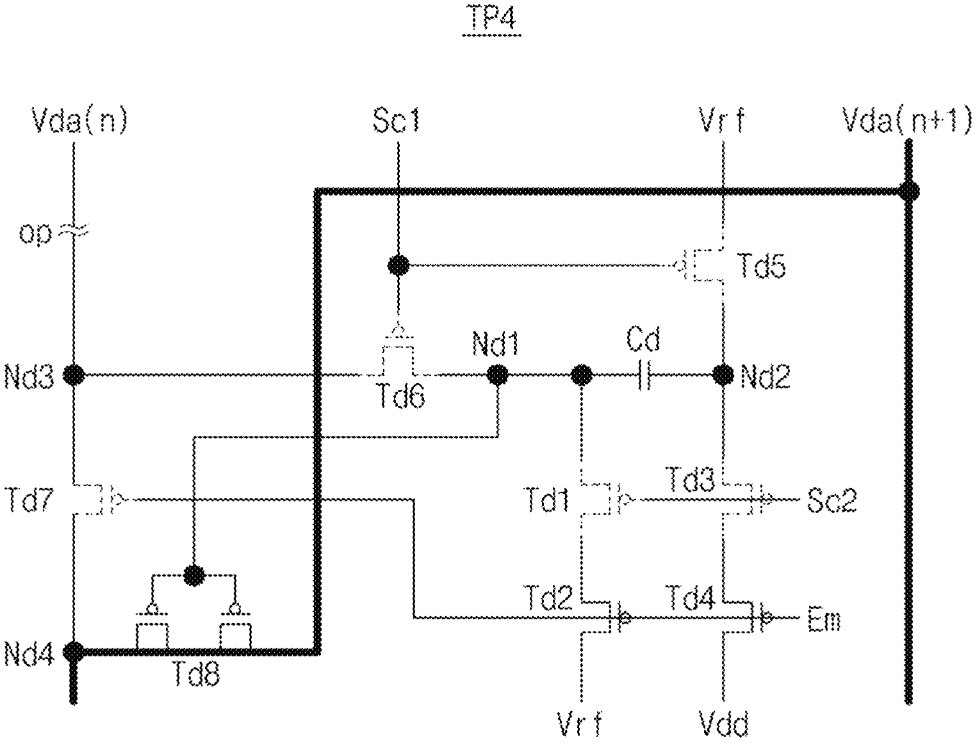

In FIGS. 4 and 7D, during the fourth time period TP4 where the data line has an open portion op (is cut), the second, fourth and seventh dummy transistors Td2, Td4 and Td7 are turned on according to the emission signal Em of a logic low voltage Vl, and the first, third, fifth and sixth dummy transistors Td1, Td3, Td5 and Td6 are turned off according to the first scan signal Sc1 and the second scan signal of a logic high voltage Vh. Accordingly, the eighth dummy transistor Td8 is turned on, and the (n+1)th data signal Vda(n+1) is applied to the nth data line through the eighth dummy transistor Td8. As a result, the nth data line is connected to the (n+1)th data line.

In each dummy subpixel SPd of the display device 110 according to an embodiment of the present disclosure where the data line has an open portion op (is cut), the high level signal Vdd is stored in the dummy capacitor Cd during the second time period TP2, and the eighth dummy transistor Td8 is turned on during the fourth time period TP4 (for one frame) such that the nth and (n+1)th data lines are connected to each other. As a result, the nth and (n+1)th data lines may transmit the (n+1)th data signals Vda(n+1).

Operation of normal and abnormal states of the display device 110 will be illustrated with reference to drawings.

Figure 8A:
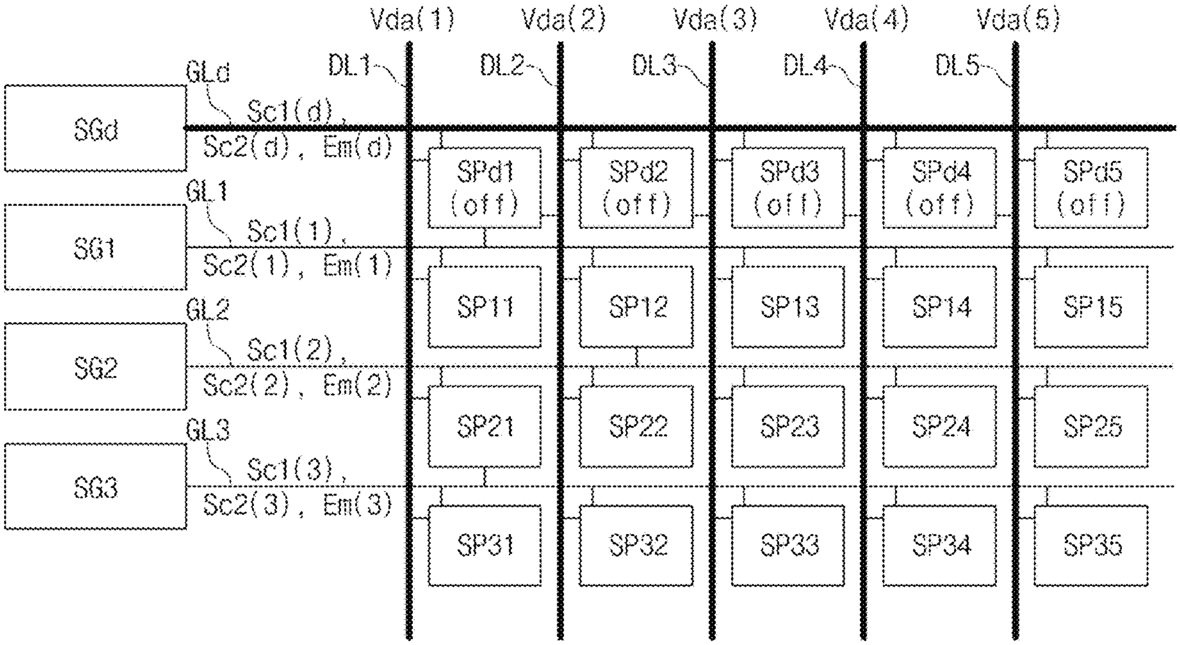
FIGS. 8A and 8B are views showing operation states of a display panel including a data line not having an open portion of a display device according to an embodiment of the present disclosure.
Figure 8B:
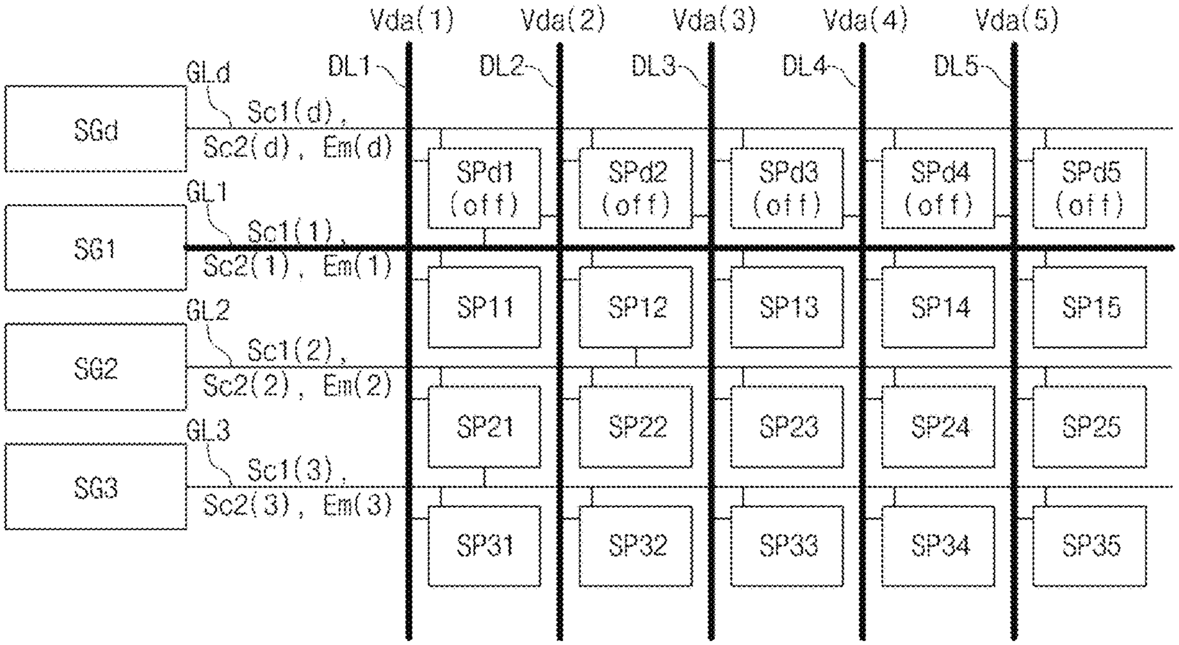
Figure 9A:
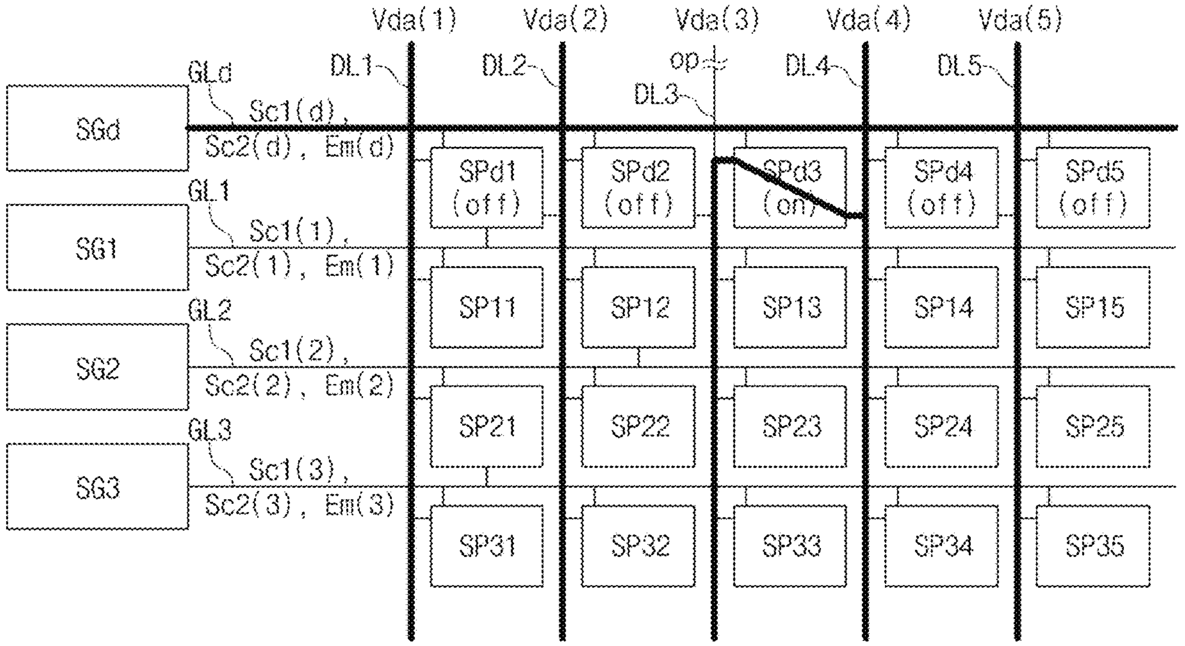
FIGS. 9A and 9B are views showing operation states of a display panel including a data line having an open portion of a display device according to an embodiment of the present disclosure.
Figure 9B:
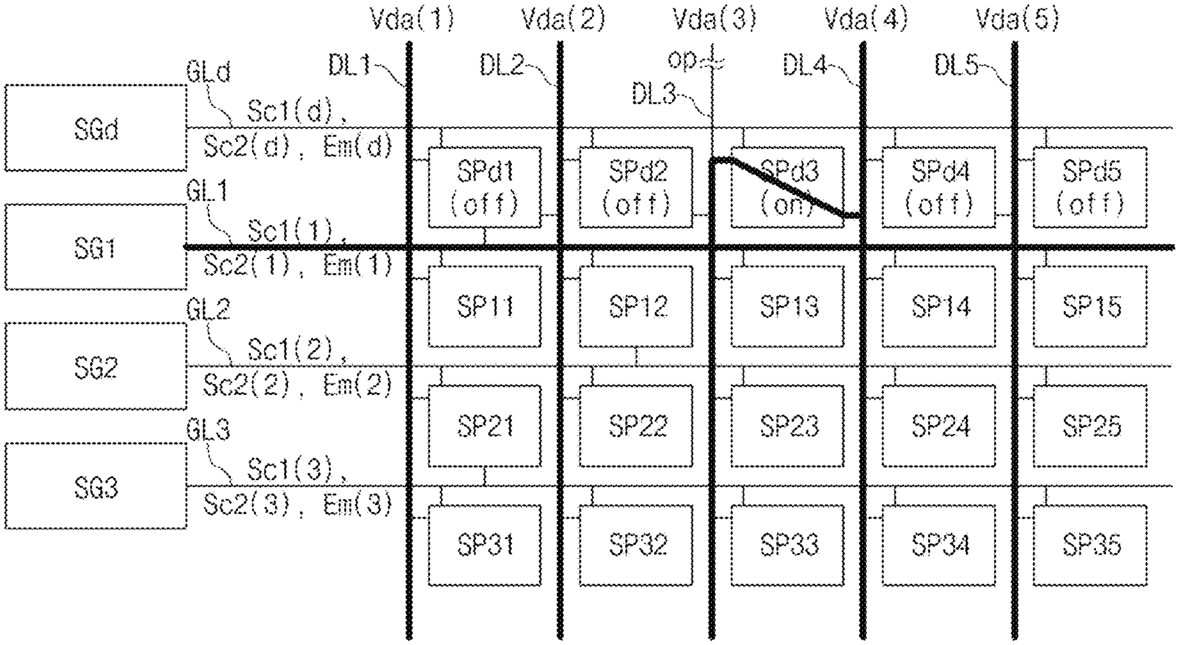

FIGS. 8A and 8B are views showing operation states of a display panel including a data line not having an open portion of a display device according to an embodiment of the present disclosure, and FIGS. 9A and 9B are views showing operation states of a display panel including a data line having an open portion of a display device according to an embodiment of the present disclosure.

In FIG. 8A, a dummy stage SGd of a shift register of the first and second gate driving units 124 and 126 of the display device 110 according to an embodiment of the present disclosure generates a dummy first scan signal Sc1(*d*), a dummy second scan signal Sc2(*d*) and a dummy emission signal Em(d) and supplies the dummy first scan signal Sc1(*d*), the dummy second scan signal Sc2(*d*) and the dummy emission signal Em(d) to three dummy gate lines GLd, respectively.

The data driving unit 122 supplies first to fifth data signals Vda(1) to Vda(5) to first to fifth data lines DL1 to DL5, respectively.

When the first to fifth data lines DL1 to DL5 do not have an open portion (are not cut or are a normal data line), first to fifth dummy subpixels SPd1 to SPd5 of the non-display area NDA operate according to the dummy first scan signal Sc1(*d*), the dummy second scan signal Sc2(*d*) and the dummy emission signal Em(d), and the eighth dummy transistor Td8 of each of the first to fifth dummy subpixels SPd1 to SPd5 is turned off for one frame.

In FIG. 8B, a first stage SG1 of the shift register of the first and second gate driving units 124 and 126 of the display device 110 according to an embodiment of the present disclosure generates a first scan signal Sc1(1), a second scan signal Sc2(1) and an emission signal Em(1) for the first pixel line including $11^{th}$, $12^{th}$, $13^{th}$, 14th and 15th subpixels SP11, SP12, SP13, SP14 and SP15, and supplies the first scan signal Sc1(1), the second scan signal Sc2(1) and the emission signal Em(1) for the first pixel line to three first gate lines GL1, respectively.

The $11^{th}$, $12^{th}$, $13^{th}$, $14^{th}$ and $15^{th}$ subpixels SP11, SP12, SP13, SP14 and SP15 corresponding to three first gate lines GL1 display an image using the first to fifth data signals Vda(1) to Vda(5) transmitted through the first to fifth data lines DL1 to DL5, respectively, and the first scan signal Sc1(1), the second scan signal Sc2(1) and the emission signal Em(1) for the first pixel line transmitted through the three first gate lines GL1, respectively.

Next, subpixels corresponding to three second gate lines GL2 and three third gate lines GL3 operate similarly to the subpixels corresponding to the three first gate lines GL1. That is, the $21^{st}$, $22^{nd}$, $23^{rd}$, $24^{th}$ and $25^{th}$ subpixels SP21, SP22, SP23, SP24 and SP25 in a second pixel line may operate according to a first scan signal Sc1(2), a second scan signal Sc2(2) and the emission signal Em(2) for the second pixel line, which are generated by a second stage SG2 of the shift register of the first and second gate driving units 124 and 126. In addition, the $31^{st}$, $32^{nd}$, $33^{rd}$, $34^{th}$ and $35^{th}$ subpixels SP31, SP32, SP33, SP34 and SP35 in a third pixel line may operate according to a first scan signal Sc1(3), a second scan signal Sc2(3) and the emission signal Em(3) for the third pixel line, which are generated by a third stage SG3 of the shift register of the first and second gate driving units 124 and 126.

In the display device 110 according to an embodiment of the present disclosure, when the first to fifth data lines DL1 to DL5 do not have an open portion (are not cut), the eighth dummy transistor Td8 of each of the first to fifth dummy subpixels SPd1 to SPd5 of the non-display area NDA is turned off, and the plurality of subpixels of the display area DA may display an image using the data signal of the plurality of data lines.

In FIG. 9A, the dummy stage SGd of the shift register of the first and second gate driving units 124 and 126 of the display device 110 according to an embodiment of the present disclosure generates the dummy first scan signal Sc1(*d*), the dummy second scan signal Sc2(*d*) and the dummy emission signal Em(d) and supplies the dummy first scan signal Sc1(*d*), the dummy second scan signal Sc2(*d*) and the dummy emission signal Em(d) to three dummy gate lines GLd, respectively.

The data driving unit 122 supplies the first to fifth data signals Vda(1) to Vda(5) to the first to fifth data lines DL1 to DL5, respectively.

When the third data line DL3 of the first to fifth data lines DL1 to DL5 has an open portion (is cut or an abnormal data line), the first to fifth dummy subpixels SPd1 to SPd5 of the non-display area NDA operate according to the dummy first scan signal Sc1(*d*), the dummy second scan signal Sc2(*d*) and the dummy emission signal Em(d). Further, for one frame, the eighth dummy transistor Td8 of each of the first, second, fourth and fifth dummy subpixels SPd1, SPd2, SPd4 and SPd5 is turned off, and the eighth dummy transistor Td8 of the third dummy subpixel SPd3 is turned on. Accordingly, the third and fourth data lines DL3 and DL4 are connected to each other, and the fourth data signal Vda(4) of the fourth data line DL4 is applied to the third data line DL3.

In FIG. 9B, the first stage SG1 of the shift register of the first and second gate driving units 124 and 126 of the display device 110 according to an embodiment of the present disclosure generates the first scan signal Sc1(1), the second scan signal Sc2(1) and the first emission signal Em(1) for the first pixel line including $11^{th}$, $12^{th}$, $13^{th}$, $14^{th}$ and $15^{th}$ subpixels SP11, SP12, SP13, SP14 and SP15, and supplies the first scan signal Sc1(1), the second scan signal Sc2(1) and the emission signal Em(1) for the first pixel line to three first gate lines GL1, respectively.

The $11^{th}$, $12^{th}$, $14^{th}$ and $15^{th}$ subpixels SP11, SP12, SP14 and SP15 corresponding to three first gate lines GL1 display an image using the first, second, fourth and fifth data signals Vda(1), Vda(2), Vda(4) and Vda(5) transmitted through the first, second, fourth and fifth data lines DL1, DL2, DL4 and DL5, respectively, and the first scan signal Sc1(1), the second scan signal Sc2(1) and the emission signal Em(1) for the first pixel line transmitted through the three first gate lines GL1, respectively. Further, the 13th subpixel SP13 corresponding to the three first gate lines GL1 displays an image using the fourth data signal Vda(4) applied to the fourth data line DL4 and transmitted through the third data line DL3, and the first scan signal Sc1(1), the second scan signal Sc2(1) and the emission signal Em(1) for the first pixel line transmitted through the three first gate lines GL1, respectively.

Next, subpixels corresponding to three second gate lines GL2 and three third gate lines GL3 operate similarly to the subpixels corresponding to the three first gate lines GL1.

In the display device 110 according to an embodiment of the present disclosure, when at least one of the first to fifth data lines DL1 to DL5 has an open portion (is cut), the eighth dummy transistor Td8 of one of the first to fifth dummy subpixels SPd1 to SPd5 of the non-display area NDA corresponding to the at least one data line having an open portion is turned on, and the eighth dummy transistor Td8 of the others of the first to fifth dummy subpixels SPd1 to SPd5 is turned off. As a result, at least one of the plurality of subpixels of the display area DA corresponding to the at least one data line having an open portion may display an image using the data signal of an adjacent data line, and others of the plurality of subpixels may display an image using the data signal of the corresponding data lines.

Consequently, in the display device according to an embodiment of the present disclosure, since a repair circuit for connecting the data line having an open portion to the adjacent data line using the first scan signal Sc1, the second scan signal Sc2 and the emission signal Em is disposed in the non-display area NDA, the subpixel corresponding to the data line having the open portion displays an image using the data signal of the adjacent data line. As a result, a line defect such as a bright line is prevented, a display quality is improved, and a low power consumption driving is obtained. The present disclosure is not limited thereto, for example, in some embodiments, the dummy subpixel SPd may be connected between two data lines, and a first data line and a second data line in the two data lines may not be adjacent. In this case, when the first data line and the second data line transmit a data signal respectively, the dummy subpixel SPd may electrically separate the first data line and the second data line from each other. That is, in the case in which there is not an open portion in both of the first data line and the second data line, the dummy subpixel SPd does not electrically connect the first data line and the second data line. In addition, when at least one portion of the first data line does not transmit a data signal and the second data line transmits a data signal, the dummy subpixel SPd may electrically connect the first data line and the second data line. That is, in the case in which there is an open portion in the first data line and there is not an open portion in the second data line, the dummy subpixel SPd electrically connect the first data line and the second data line from each other, such that at least one of the plurality of subpixels corresponding to the first data line may display an image using the data signal of the second data line.

Although the dummy subpixel SPd having the repair circuit is disposed at an upper portion of the non-display area NDA in the embodiment of FIG. 1, the dummy subpixel SPd having the repair circuit may be disposed at a lower portion of the non-display area NDA in another embodiment. In another embodiment, the line defect may be prevented even when the data line DL has an open portion in the display area DA.

It will be apparent to those skilled in the art that various modifications and variation may be made in the present disclosure without departing from the scope of the disclosure. Thus, it is intended that the present disclosure cover the modifications and variations of this disclosure including those of the appended claims and their equivalents.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a timing controlling circuit configured to generate an image data, a data control signal, and a gate control signal;

a data driving circuit configured to generate a data signal based on the image data and the data control signal;

a gate driving circuit configured to generate a gate signal based on the gate control signal;

a display panel configured to display an image based on the data signal and the gate signal and including a display area and a non-display area at a periphery of the display area;

a plurality of subpixels in the display area, each of the plurality of subpixels including a plurality of transistors, a storage capacitor and a light emitting diode; and a plurality of dummy subpixels in the non-display area, each of the plurality of dummy subpixels including a plurality of dummy transistors and a dummy capacitor and connecting a data line having an open portion and an adjacent data line.

2. The display device of claim 1, wherein the plurality of dummy transistors comprise:

a first dummy transistor configured to be switched according to a second scan signal and connected to a first dummy node;

a second dummy transistor configured to be switched according to an emission signal and connected to the first dummy transistor and a reference signal;

a third dummy transistor configured to be switched according to the second scan signal and connected to a second dummy node;

a fourth dummy transistor configured to be switched according to the emission signal and connected to the third dummy transistor and a high level signal;

a fifth dummy transistor configured to be switched according to a first scan signal and connected to the second dummy node and the reference signal;

a sixth dummy transistor configured to be switched according to the first scan signal and connected to the first dummy node and a third dummy node a seventh dummy transistor configured to be switched according to the emission signal and connected to the third dummy node and a fourth dummy node; and an eighth dummy transistor configured to be switched according to a voltage of the first dummy node and connected to the fourth dummy node and an (n+1)th data line, n being a positive integer.

3. The display device of claim 2, wherein the dummy capacitor is connected between the first dummy node and the second dummy node.

4. The display device of claim 3, wherein a source electrode of the first dummy transistor, a source electrode of the sixth dummy transistor and a first capacitor electrode of the dummy capacitor are directly connected to the first dummy node, wherein a source electrode of the third dummy transistor, a drain electrode of the fifth dummy transistor and a second capacitor electrode of the dummy capacitor are directly connected to the second dummy node, wherein a drain electrode of the sixth dummy transistor, a source electrode of the seventh dummy transistor and an nth data line are directly connected to the third dummy node, and wherein a drain electrode of the seventh dummy transistor and a source electrode of the eighth dummy transistor are directly connected to the fourth dummy node.

5. The display device of claim 4, wherein, during a first time period, the second scan signal and the emission signal have a logic low voltage, and the first scan signal has a logic high voltage, wherein, during a second time period, the first scan signal and the second scan signal have a logic low voltage, and the emission signal has a logic high voltage, wherein, during a third time period, the first scan signal, the second scan signal and the emission signal have a logic high voltage, and wherein, during a fourth time period, the emission signal has a logic low voltage, and the first scan signal and the second scan signal have a logic high voltage.

6. The display device of claim 5, wherein, when the nth data line does not have an open portion, during the fourth time period, the eighth dummy transistor is turned off, and wherein, when the nth data line has an open portion, during the fourth time period, the eighth dummy transistor is turned on.

7. The display device of claim 1, wherein the plurality of dummy subpixels are disposed at an upper portion of the non-display area, at a lower portion of the non-display area, or at both of upper and lower portions of the non-display area.

8. The display device of claim 1, wherein the plurality of transistors comprise:

a first transistor configured to be switched based on a voltage of a first node and connected to a high level signal and a second node;

a second transistor configured to be switched based on an emission signal and connected to the second node and a fourth node;

a third transistor configured to be switched based on a second scan signal and connected to the first node and the second node;

a fourth transistor configured to be switched based on the second scan signal and connected to the fourth node and a reference signal;

a fifth transistor configured to be switched based on the emission signal and connected to a third node and the reference signal; and a sixth transistor configured to be switched based on a first scan signal and connected to the third node and a data signal.

9. The display device of claim 8, wherein the storage capacitor is connected between the first node and the third node, and wherein the light emitting diode is connected between the fourth node and a low level signal.

10. The display device of claim 9, wherein a gate electrode of the first transistor, a first capacitor electrode of the storage capacitor and a drain electrode of the fifth transistor are directly connected to the first node, wherein a drain electrode of the first transistor, a source electrode of the second transistor and a source electrode of the third transistor are directly connected to the second node, wherein a second capacitor electrode of the storage capacitor, a source electrode of the fifth transistor and a source electrode of the sixth transistor are directly connected to the third node, and wherein a drain electrode of the second transistor, a source electrode of the fourth transistor and an anode of the light emitting diode are directly connected to the fourth node.

11. The display device of claim 6, wherein when the eighth dummy transistor is turned off, the nth data line and the (n+1)th data line are not connected to each other.

12. The display device of claim 6, wherein when the eighth dummy transistor is turned on, the nth data line and the (n+1)th data line are connected to each other.

13. The display device of claim 1, wherein each of the plurality of dummy subpixels does not include a light emitting diode.

14. A display device, comprising:

a display panel including a display area and a non-display area at a periphery of the display area;

a plurality of subpixels in the display area, each of the plurality of subpixels including a plurality of transistors, a storage capacitor and a light emitting diode; and a plurality of dummy subpixels in the non-display area, each of the plurality of dummy subpixels is connected to two data lines.

15. The display device of claim 14, further comprising: a data driving circuit configured to generate a data signal, and a gate driving circuit configured to generate a first scan signal, a second scan signal, and an emission signal.

16. The display device of claim 14, wherein when a first data line and a second data line in the two data lines transmit data signals respectively, each of the plurality of dummy subpixels electrically separates the first data line and the second data line from each other.

17. The display device of claim 14, wherein when at least one portion of a first data line in the two data lines does not transmit a data signal and a second data line in the two data lines transmits a data signal, each of the plurality of dummy subpixels electrically connect the first data line and the second data line from each other.

18. The display device of claim 14, wherein each of the plurality of dummy subpixels connects a data line having an open portion and an adjacent data line.

* * * * *